(12) United States Patent
Toki et al.

(10) Patent No.: US 6,168,729 B1
(45) Date of Patent: Jan. 2, 2001

(54) FLUORESCENT MATERIAL AND FLUORESCENT DISPLAY DEVICE

(75) Inventors: Hitoshi Toki; Fumiaki Kataoka; Shigeo Itoh; Yoshitaka Sato, all of Chiba-ken (JP)

(73) Assignee: Futaba Denshi Kogyo, K.K., Chiba-ken (JP)

( * ) Notice: Under 35 U.S.C. 154(b), the term of this patent shall be extended for 51 days.

(21) Appl. No.: 08/720,154

(22) Filed: Sep. 25, 1996

(51) Int. Cl.[7] .............................. H01J 27/20; C09K 11/00
(52) U.S. Cl. .......................... 252/301.4 R; 252/301.4 R; 252/301.6 R; 252/301.6 F; 313/467; 313/468; 313/496
(58) Field of Search ..................... 313/467, 468, 313/496; 256/301.4 R, 301.4 F, 301.6 R, 301.6 F (56) References Cited

U.S. PATENT DOCUMENTS

| | | | |
|---|---|---|---|
| 2,628,201 | * 2/1953 | Smith | 252/301.6 R |
| 4,303,913 | * 12/1981 | Tohda et al. | 313/467 |
| 5,619,098 | * 4/1997 | Toki et al. | 313/496 |
| 6,090,309 | * 7/2000 | Chadha et al. | 252/301.4 R |

FOREIGN PATENT DOCUMENTS 5-59359 * 3/1993 (JP) ................ 252/301.6 R

* cited by examiner

*Primary Examiner*—C. Melissa Koslow
(74) *Attorney, Agent, or Firm*—Breiner & Breiner

(57) ABSTRACT

A fluorescent material and a display device incorporating the fluorescent material are described. The fluorescent material is a mixture including a phosphor which is excitable at a voltage of 1 kV or higher for emitting light and a phosphor which is excitable at a voltage of 1 kV or lower for emitting light, wherein each phosphor emits light of the same color and the fluorescent material is luminous at an anode voltage of 2 kV or lower. The fluorescent display device accelerates electrons emitted from an electron source at an anode voltage of 2 kV or lower and rushes these electrons against an anode for exciting the fluorescent material present on the anode. The fluorescent material is a mixture as set forth above.

4 Claims, 6 Drawing Sheets

FLUORESCENT MATERIAL AND FLUORESCENT DISPLAY DEVICE

BACKGROUND OF THE INVENTION

1. Field of the Industrial Invention

The present invention relates to a fluorescent material that is excited for luminescence by a low-speed electron ray so that it keeps a luminance characteristic excellent and more particularly to a fluorescent display device composed to have the fluorescent material.

2. Description of the Related Art

It is considered that a fluorescent display device having a filament type oxide cathode or a field emission type cathode served as an electron source should preferably have an anode voltage in the range of 30 V to 2 KV. If the fluorescent material is excited for luminescence by the so-called low-speed electron line of 2 KV or lower, it is important to keep the resistance of the fluorescent material low and a luminance characteristic, that is, dependency on a voltage density and a current density excellent. Another important point is that the fluorescent material does not contain such a material as having an adverse effect on the cathode served as the electron source. However, There is no fluorescent material that meets individually these important conditions.

SUMMARY OF THE INVENTION

It is an object of the present invention to provide a fluorescent material that has not an adverse effect on a cathode but an excellent luminance characteristic in the fluorescent display device having an anode voltage of 2 KV or lower and a fluorescent display device composed to have such a fluorescent material.

According to a first aspect of the invention, a fluorescent material is composed of a mixture of a highly resistive fluorescent material having excellent current and voltage characteristics in an anode voltage of 1 KV or higher and a low resistive fluorescent material having excellent current and voltage characteristics in an anode voltage of 1 KV or lower and is excited by the rush of electrons accelerated by the anode voltage of 2 KV or lower.

According to a second aspect of the invention, the fluorescent material is composed of the highly resistive fluorescent material that is a selective one of the materials of $Y_2O_3$:Eu, $YVO_4$:Eu, and $Cd_2O_3$:Eu and the low fluorescent material that is a selective one of the materials of $SnO_2$:Eu and $SrTiO_3$:P, X (X=Al, Ga).

According to a third aspect of the invention, the fluorescent material is composed of the highly resistive fluorescent material that is a selective one of the materials of $Y_3(Al, Ga)_5O_{12}$:Tb, $Y_2SiO_5$:Tb, $InBO_3$:Tb, and $Zn_2SiO_4$:Mn and the low resistive fluorescent material that is Zn(Ga, Al)$_2O_4$:Mn.

According to a fourth aspect of the invention, the fluorescent material is composed of the highly resistive material that is a selective one of the materials of $Y_2SiO_5$:Ce, $CaWO_4$, (Ca, Mg)$SiO_3$:Ti, (Y, Sr)$TaO_4$:Nb, and $Zn_2SiO_4$:Ti and the low resistive material that is a selective one of the materials of $ZnGa_2O_4$:Li and ZnO:Zn.

According to a fifth aspect of the invention, a fluorescent display device arranged to accelerate electrons emitted from an electron source at a driving voltage of 2 KV or lower and rush the electrons to an anode for making the fluorescent material of the anode luminous is composed of the fluorescent material according to the first aspect of the invention.

According to a sixth aspect of the invention, the fluorescent display device composed according to the fifth aspect of the invention includes a filament type oxide cathode served as the electron source.

According to a seventh aspect of the invention, the fluorescent display device composed according to the fifth aspect of the invention includes a field emission type cathode served as the electron source.

As described above, the fluorescent material according to the present invention is composed of a mixture of the highly resistive fluorescent material and the low resistive fluorescent material. Hence, the fluorescent material does not have an adverse effect on the cathode in the fluorescent display device operated at a driving voltage of 2 KV or lower and makes it possible to display the excellent luminance characteristic and tone.

Further objects and advantages of the present invention will be apparent from the following description of the preferred embodiments of the invention as illustrated in the accompanying drawings.

DESCRIPTION OF THE PREFERRED EMBODIMENTS

An embodiment of the present invention will be described with reference to FIGS. 1 to 10. This embodiment concerns with a red emission fluorescent material, a blue emission fluorescent material, and a green emission fluorescent material, all of which meet the foregoing object, and a full-color fluorescent display device composed to have these fluorescent materials.

(1) Red Emission Fluorescent Material

Figure 1:
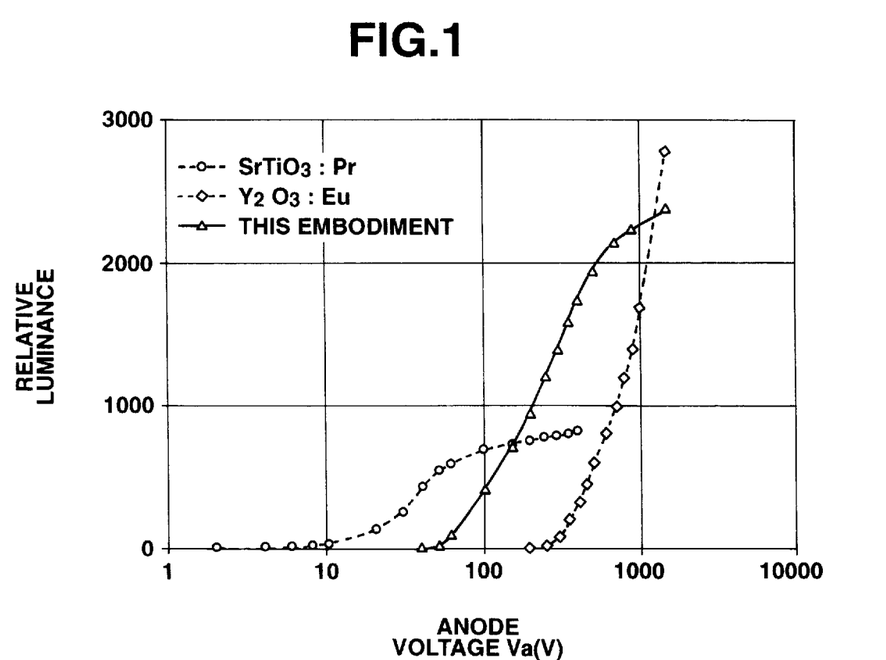
FIG. 1 is a table showing a relation between an anode voltage and an emission luminance of a fluorescent material displayed by a relative luminance about a red emission fluorescent material of the present invention and a fluorescent material of the comparative example.
Figure 2:
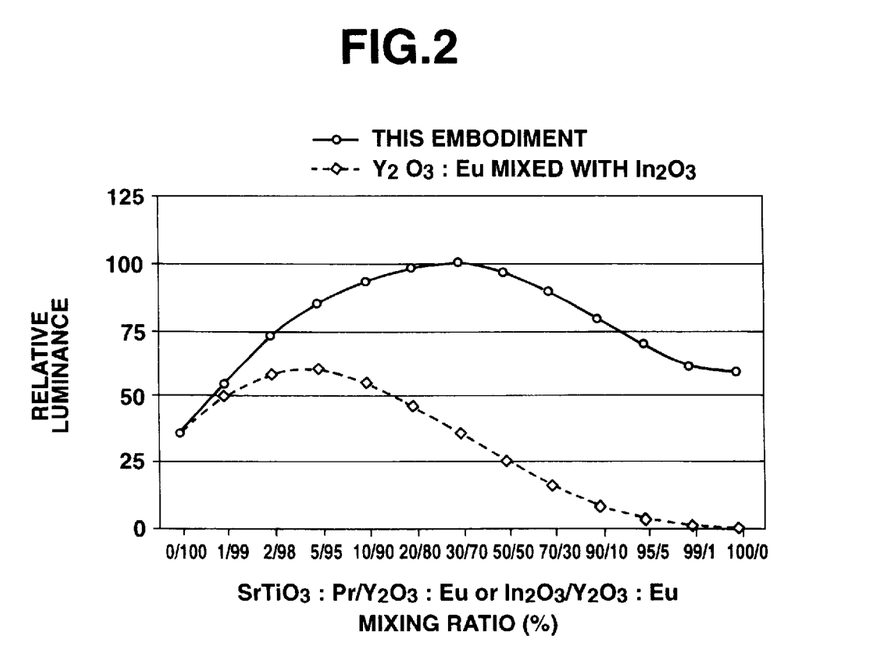
FIG. 2 is a table showing a relation between a mixing ratio of components and an emission luminance of a fluorescent material displayed by a relative luminance about the red emission fluorescent material of the present invention and the fluorescent material of the comparative example.
Figure 3:
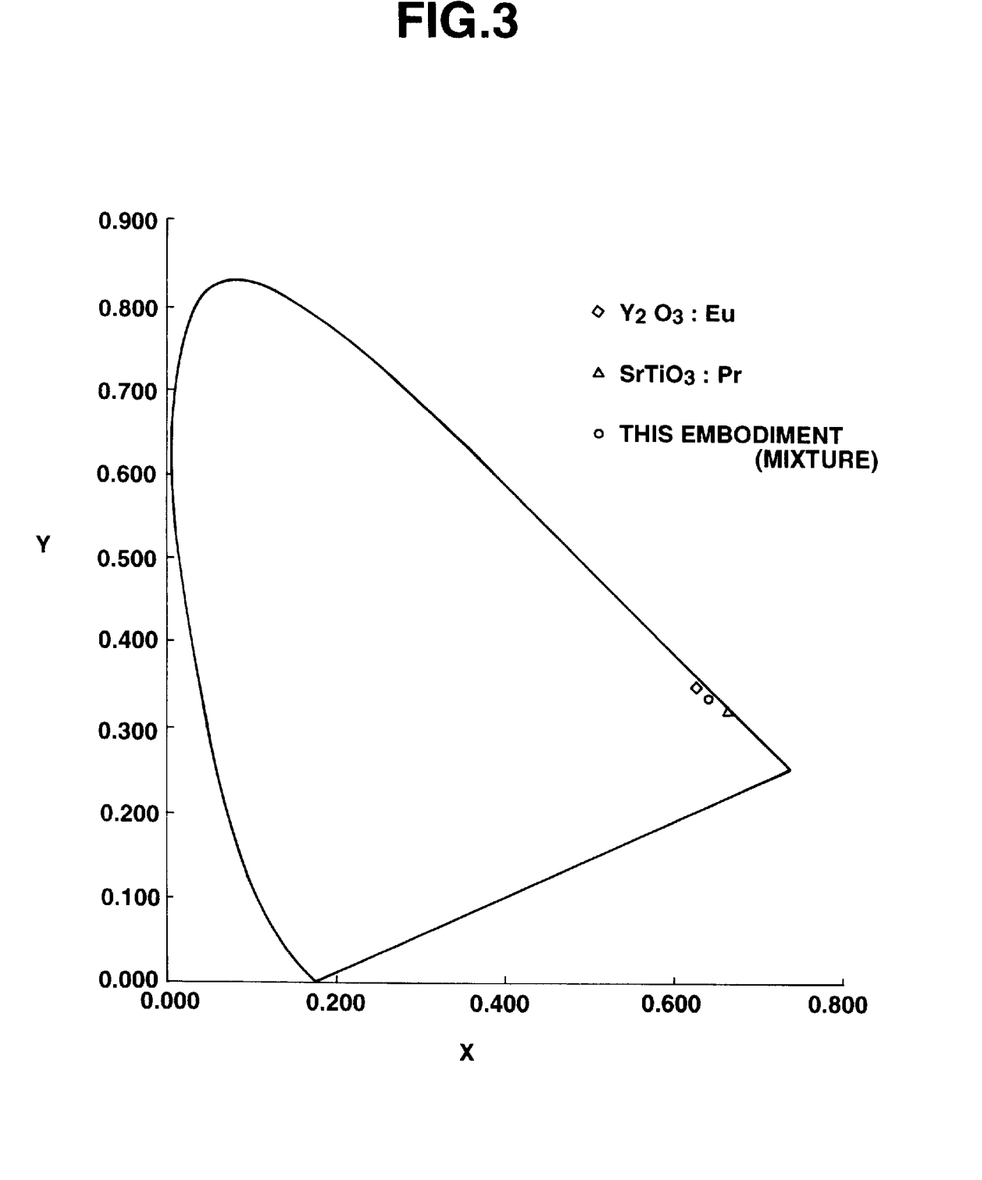
FIG. 3 is a graph showing a CIE chromaticity indicating chromaticity of the red emission fluorescent material of the present invention and the fluorescent material of the comparative example.

At first, the description will be oriented to a red emission fluorescent material according to this embodiment with reference to FIGS. 1 to 3. The inventors of the present application have tried various experiments for achieving the foregoing object about the red emission fluorescent material. The experiments indicated the following fact. That is, for the red emission fluorescent materials such as $SnO_2$:Eu, ZnCdS:Ag, $SrTiO_3$:Pr, X(X=Al, Ga etc.), $Y_2O_2S$:Eu, and $Y_2O_3$:Eu, if only one of these materials is used for a display portion of a fluorescent display device driven at a voltage of 2 KV or lower, this material does not completely achieve the foregoing object.

Concretely, though the material of ZnCdS:Ag is low in resistance, it contains S so that it degrades the cathode. The material of $SnO_2$:Eu is low in tone and luminance characteristic though it is low in resistance. The materials of $SrTiO_3$:Pr, X (X=Al, Ga etc.) is excellent in tone and resistance. However, these materials are not excellent in dependency of an emission luminance on a voltage and a current densities, because it is likelihood that they are saturated in the driving condition of 100 V or higher. The material of $Y_2O_3$:Eu is low in tone and high in mother resistance, so it cannot be solely used because electrons are condensed on the surface of the material. For using the material of $Y_2O_3$:Eu, it may be mixed with a conductive material such as $In_2O_3$. In this case, however, since the non-luminous is mixed with the material of $Y_2O_3$:Eu, a non-luminous portion is present on the fluorescent surface, which is disadvantageous in effective emission. Moreover, with this method, the inferior tone is not solved. About the tone, by adjusting an Eu density, it is possible to make the color closer to the Red. In the driving condition of the foregoing object, however, the luminance is remarkably made lower, which is not preferable. The material of $Y_2O_2S$:Eu has a characteristic of degrading the cathode, because it contains S.

On the basis of the foregoing fact about each fluorescent material and the repeated experiments and studies, the inventors of the present application have invented the following fluorescent material as the red emission fluorescent material for achieving the foregoing object. That is, this fluorescent material is basically composed of a fluorescent material that is low resistive though it is inferior in the voltage and current characteristic and a highly resistive fluorescent material that is excellent in the voltage and current characteristic at the driving voltage of 1 KV or higher, both of which are properly combined and mixed at a proper ratio.

In this embodiment, the low resistive fluorescent material is $SrTiO_3$:Pr, X (X=Al, Ga etc.) whose average grain diameter is about 3 $\mu$m. The highly resistive fluorescent material is $Y_2O_3$:Eu whose average grain diameter is about 4 $\mu$m. By mixing these fluorescent materials at the different mixing ratios, various materials with respective mixing ratios are manufactured. For the comparison, by mixing the fluorescent materials of $Y_2O_3$:Eu and $In_2O_3$ at the different mixing ratios, various fluorescent materials with different mixing ratios are prepared. Further, for the comparison, the fluorescent materials of $SrTiO_3$:Pr, X(X=Al, Ga etc.) and $Y_2O_3$:Eu are prepared respectively. The fluorescent display device are manufactured in which fluorescent materials are respectively coated on an anode conductor. In the same driving condition, the fluorescent display devices are driven for comparing the emission luminances of these devices with one another in relative luminance.

FIG. 1 shows the emission luminances of the fluorescent materials of $SrTiO_3$:Pr, X(X=Al, Ga etc.) and $Y_2O_3$:Eu and the fluorescent materials composed of the mixture of them according to this embodiment. The mixing ratio of these fluorescent materials is $SrTiO_3$:Pr/$Y_2O_3$:Eu=30/70.

FIG. 2 shows the emission luminances of the fluorescent display device composed of the fluorescent material of this embodiment and the cited fluorescent display device composed of the material of $Y_2O_3$:Eu mixed with $In_2O_3$ where they are driven at an anode voltage of 400 V. In any mixing ratio, the fluorescent display device of this embodiment is superior in the emission luminance to the fluorescent material of $Y_2O_3$:Eu mixed with $In_2O_3$ at any mixing ratios. In the range of the mixing ratio of the fluorescent materials of $SrTiO_3$:Pr/$Y_2O_3$:Eu=1/99 to 99/1, the effective result may be provided. In particular, in the range of 2/98 to 90/10, the excellent result is provided. In the range of 20/80 to 50/50, the more excellent result is provided.

FIG. 3 shows the CIE chromaticities given by the fluorescent material of $SrTiO_3$:Pr, X (X=Al, Ga etc.), the fluorescent material of $Y_2O_3$ Eu, and the mixture of these materials according to this embodiment when they are activated. The color of the fluorescent material of this embodiment is closer to the red luminous color of the $SrTiO_3$:Pr, X material than the color of material of $Y_2O_3$:Eu which is slightly close to orange. In particular, in the full-color fluorescent display device, it can be used as a red fluorescent material without any problem. The mixing ratio of the fluorescent materials in this embodiment is $SrTiO_3$:Pr/$Y_2O_3$:Eu=30/70.

As a fluorescent material with red emission and high-resistance, a rare earth fluorescent material is used such as $YVO_4$:Eu or $Gd_2O_3$:Eu which is the same as $Y_2O_3$:Eu. In this case, this material may offer the same effect.

(2) Green Emission Fluorescent Material

Figure 4:
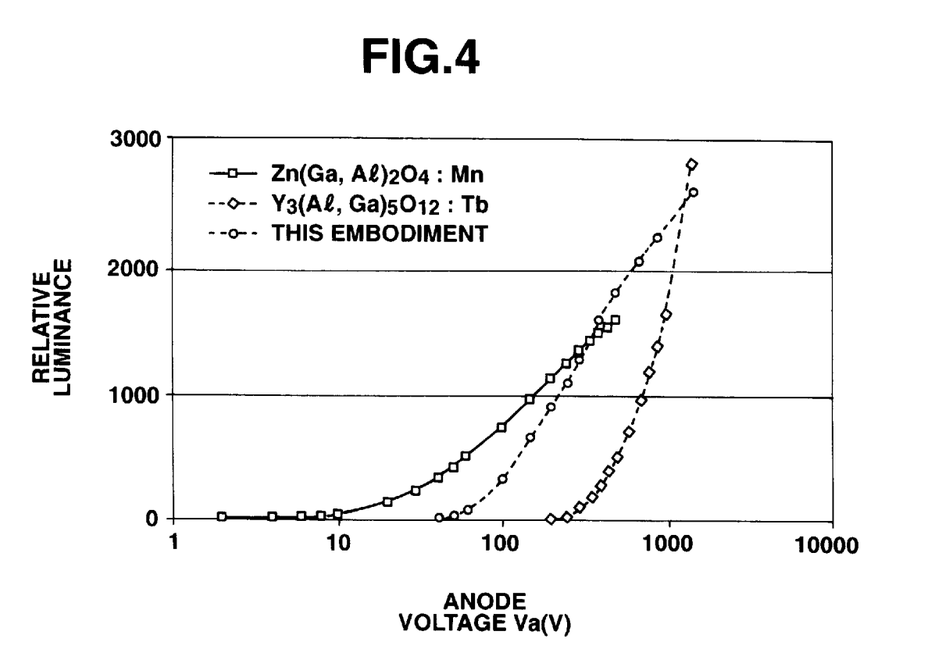
FIG. 4 is a graph showing a relation between an anode voltage and an emission luminance of the fluorescent material displayed by a relative luminance about the green emission fluorescent material of the present invention and the fluorescent material of the comparative example.
Figure 5:
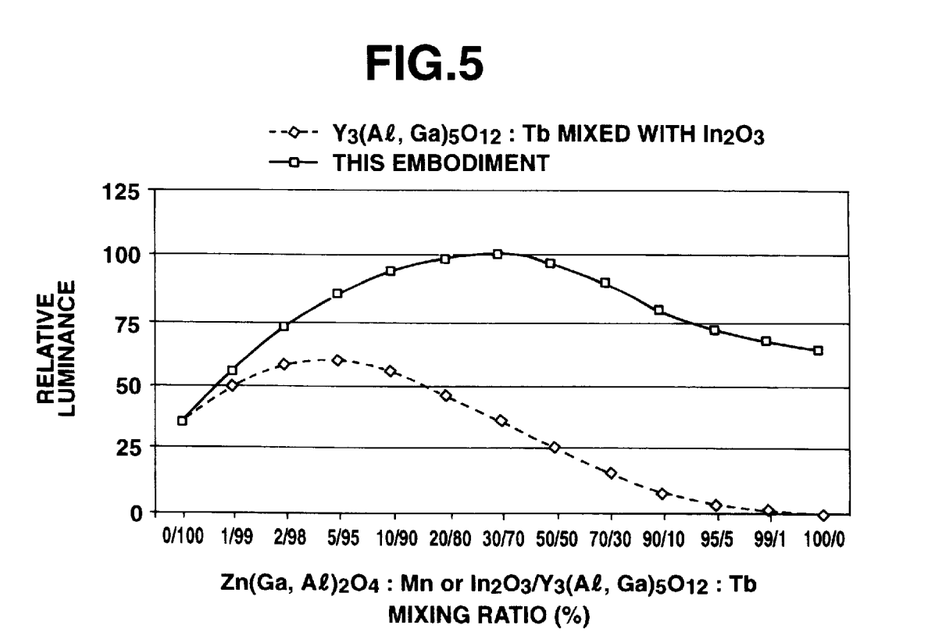
FIG. 5 is a graph showing a relation between a mixing ratio of components and an emission luminance of a fluorescent material displayed by a relative luminance about the green emission fluorescent material of the present invention and the fluorescent material of the comparative example.
Figure 6:
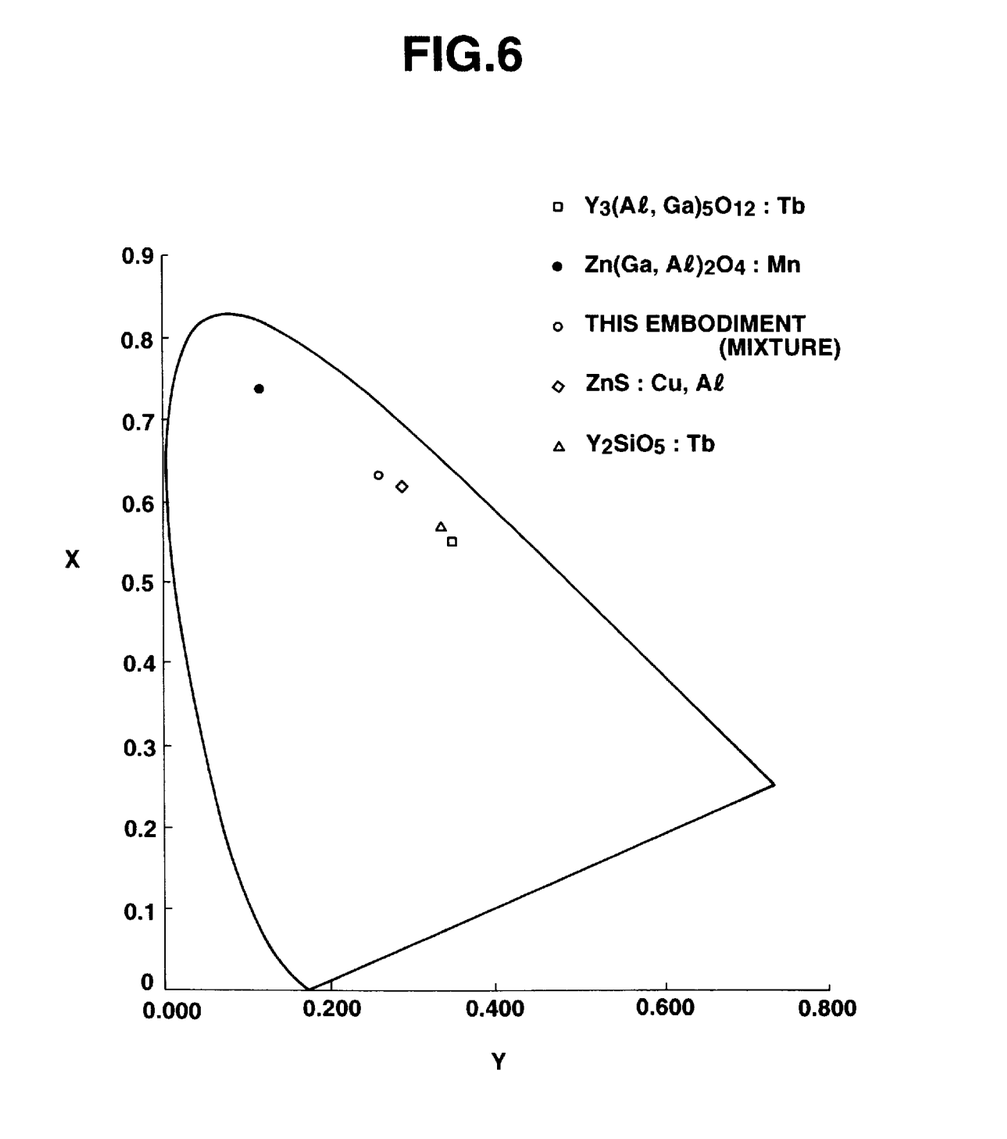
FIG. 6 is a graph showing a CIE chromaticity indicating chromaticities of the green emission fluorescent material of the present invention and the fluorescent material of the comparative example when they are made luminous.

Next, the description will be oriented to a green emission fluorescent material according to this embodiment with reference to FIGS. 4 to 6.

The inventors of the present application have tried various experiments for achieving the foregoing object about the green color emission fluorescent material. These experiments have indicated the following fact. That is, as for the green color emission fluorescent materials such as ZnS:Cu, Al, $(Zn_{1-y}, Mg_y)(Al_xGa_{1-x})_2O_4$:Mn (where x=0 to 0.2 and y=0 to 0.3), $Y_3(Al, Ga)_5O_{12}$:Tb, $Y_2SiO_5$:Tb, $InBO_3$:Tb, $Zn_2SiO_4$:Mn, and $Gd_2O_2S$:Tb, if one of them is solely used for a display portion of the fluorescent display device driven at an anode voltage of 2 KV or lower, the foregoing object cannot be completely achieved.

Concretely, the material of ZnS:Cu, Al is relatively low in resistance but contains S. Hence, it degrades the cathode. The material of $(Zn_{1-y}, Mg_y)(Al_xGa_{1-x})_2O_4$:Mn (where x=0 to 0.2, y=0 to 0.3) is excellent in tone and low in resistance. However, it is not so excellent in dependency of emission luminance to a voltage density and a current one, because it is likely to be saturated in the driving condition of 100 V or higher. The materials of $Y_3(Al, Ga)_5O_{12}$:Tb, $Y_2SiO_5$:Tb and $InBO_3$:Tb are inferior in tone and high in mother resistance, so each one cannot be solely used, because electrons are condensed on the surface of the material. The materials of $Y_3(Al, Ga)_5O_{12}$:Tb, $Y_2SiO_5$:Tb and $InBO_3$:Tb may be used by mixing them with a conductive material of $In_2O_3$ or the like. However, since the non-luminous material is mixed with the material, the non-luminous portion is contained on the fluorescent surface. Hence, the resulting fluorescent material is disadvantageous in effectively emitting a color. Further, with this method, the inferior tone cannot be solved. About the tone, the material of $Y_3(Al, Ga)_5O_{12}$:Tb has a value of x=0.3555 and y=0.555 in the CIE chromaticity, in which the emitted green color is too much close to a yellow color. That is, the proper green color cannot be represented in this chromaticity. The preferable color is more green than the color emitted by the material of ZnS:Cu, Al having a value of x=0.297 and y=0.597. Since the material of $Gd_2O_2S$:Tb contains S, the material degrades the cathode.

On the basis of the foregoing fact about each fluorescent material and the further experiments and studies, the inventors of the present application have invented the following fluorescent material as a green emission fluorescent material for achieving the foregoing object. That is, the fluorescent material is basically composed of a fluorescent material that is inferior in the voltage and current characteristic but is low in resistance and another fluorescent material that is excellent in the voltage and current characteristic at the anode voltage of 1 KV or higher and is high in resistance, both of which are properly combined and are mixed at a proper mixing ratio.

As a low resistive fluorescent material in the fluorescent material of this embodiment, the material $Zn(Ga, Al)_2O_4$:Mn whose average grain diameter is about 2.5 μm is selected from the materials such as $(Zn_{1-y}, Mg_y)(Al_xGa_{1-x})_2O_4$:Mn (where x=0 to 0.2 and y=0 to 0.3). As the highly resistive fluorescent material, the material of $Y_3(Al, Ga)_5O_{12}$:Tb whose average grain diameter is about 5 μm is used. By mixing these fluorescent materials at different the mixing ratios, various trial materials with different mixing ratios are manufactured. For the comparison, various fluorescent materials with different mixing ratios by mixing the fluorescent materials of $Y_3(Al, Ga)_5O_{12}$:Tb and $In_2O_3$ at respective ratios. Further, for the comparison, the fluorescent materials of $Zn(Ga, Al)_2O_4$:Mn and $Y_3(Al, Ga)_5O_{12}$:Tb are solely prepared. Each of these materials is coated on an anode conductor for manufacturing the fluorescent display device. In the same driving condition, each of the fluorescent display devices is driven for comparing the emission luminance of these devices with each other in relative luminance.

FIG. 4 shows the emission luminance of the fluorescent material of $Zn(Ga, Al)_2O_4$:Mn, the fluorescent material of $Y_3(Al, Ga)_5O_{12}$:Tb, and the fluorescent material of this embodiment composed of the mixture of these materials. The mixing ratio of these materials for composing the fluorescent material of this embodiment is $Zn(Ga, Al)_2O_4$:Mn/$Y_3(Al, Ga)_5O_{12}$:Tb=5/95.

FIG. 5 shows the emission luminances of the fluorescent display device having the fluorescent material of this embodiment and the comparative device having the fluorescent material of $Y_3(Al, Ga)_5O_{12}$:Tb mixed with $In_2O_3$ where they are driven at an anode voltage of 400 V. At any mixing ratio, this fluorescent material of this embodiment is superior in emission luminance to the fluorescent material of $Y_3(Al, Ga)_5O_{12}$:Tb mixed with $In_2O_3$. In the range of the mixing ratio of both fluorescent materials, $Zn(Ga, Al)_2O_4$:Mn/$Y_3(Al, Ga)_5O_{12}$:Tb=1/99 to 99/1, the effective result is obtained. In particular, in the range of 2/98 to 95/5, the more excellent result is obtained. In the range of 20/80 to 50/50, the far more excellent result is obtained.

FIG. 6 is a CIE chromaticity diagram, which shows the chromaticities of the fluorescent material of $Y_3(Al, Ga)_5O_{12}$:Tb, the fluorescent material of $Zn(Ga, Al)_2O_4$:Mn, and the fluorescent material of this embodiment composed by mixing the former two materials with each other. The color of the fluorescent material of this embodiment is closer to the green emitted by the fluorescent material of $Zn(Ga, Al)_2O_4$:Mn than the color of the fluorescent material of $Y_3(Al, Ga)_5O_{12}$:Tb which is slightly close to yellow. Hence, the material of this embodiment may be used in the full-color fluorescent display device as a green emission fluorescent material. The mixing ratio of the materials in this embodiment is $Zn(Ga, Al)_2O_4$:Mn/$Y_3(Al, Ga)_5O_{12}$:Tb=30/70.

As a fluorescent material with green emission and high-resistance, it is possible to use a fluorescent material such as $Y_2SiO_5$:Tb, InBO:Tb, or $Zn_2SiO_4$:Mn, which may offer the same effect. As shown in FIG. 3, if the preferable color is a one closer to the green than the chromaticity of ZnS:Cu, Al that is the fluorescent material used for a CRT, about the materials of $Y_3(Al, Ga)_5O_{12}$:Tb, $Y_2SiO_5$:Tb and InBO:Tb (not shown) whose chromaticities are located closer to the yellow side than the material of ZnS:Cu, Al, it is desirable to mix 20% or more of $Zn(Ga, Al)_2O_4$:Mn that is excellent in green tone. Though not shown, the chromaticity of $Zn_2SiO_4$:Mn as the green emission fluorescent material is more excellent than the material of ZnS:Cu, Al. Hence, the mixing ratio of that green emission fluorescent material against the material of $Zn(Ga, Al)_2O_4$:Mn may be 5% or more.

(3) Blue Emission Fluorescent Material

Figure 7:
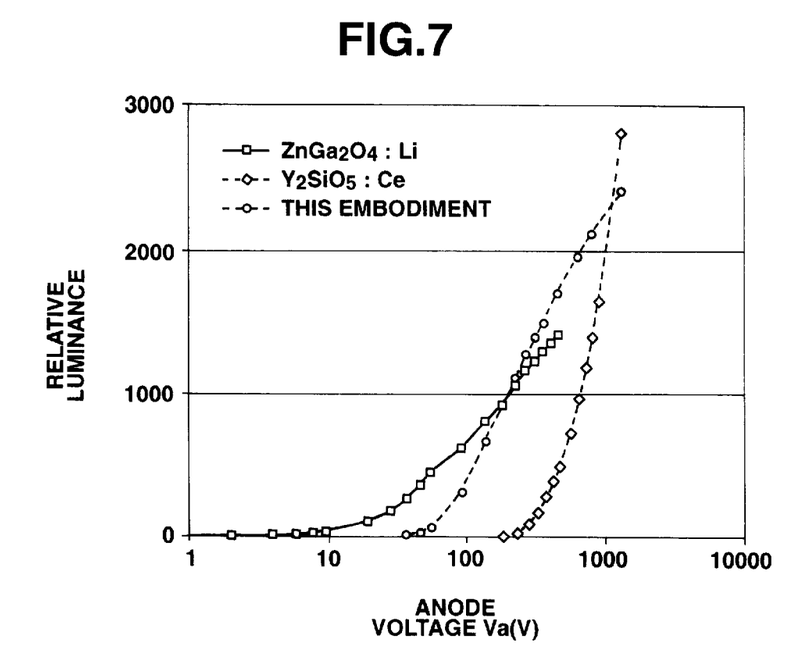
FIG. 7 is a graph showing a relation between an anode voltage and an emission luminance of the fluorescent material displayed by a relative luminance about a blue emission fluorescent material of the present invention and the fluorescent material of the comparative example.
Figure 8:
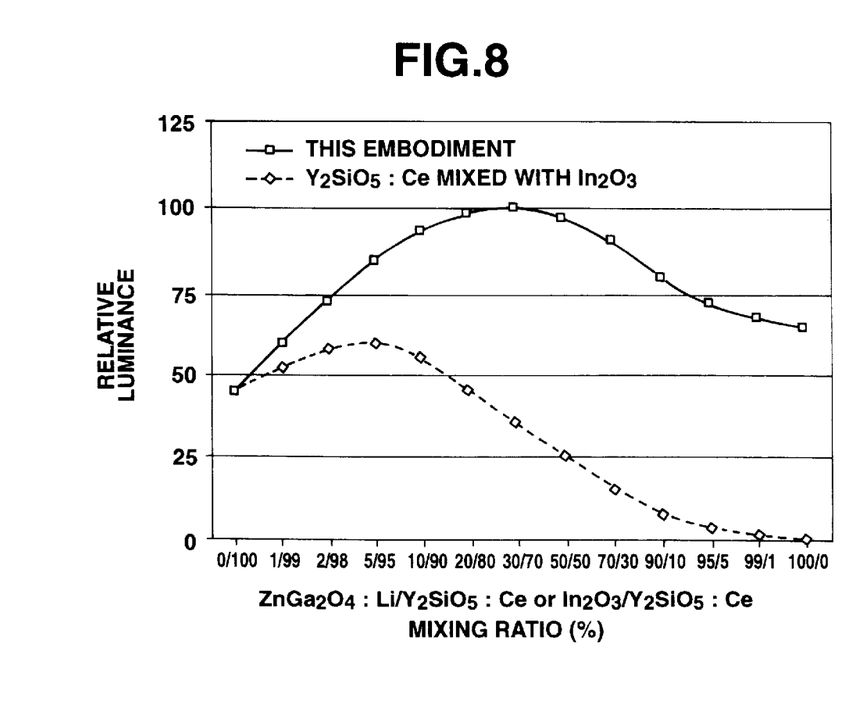
FIG. 8 is a graph showing a relation between a mixing ratio of components and an emission luminance of the fluorescent material displayed by a relative luminance about the blue emission fluorescent material of the present invention and the fluorescent material of the comparative example.

In turn, the description will be oriented to the blue emission fluorescent material of this embodiment with reference to FIGS. 7 and 8.

The inventors of the present application have repetitively tried various kinds of experiments for achieving the foregoing object about the blue emission fluorescent material. These experiments indicated the following fact. That is, about the blue emission fluorescent materials such as ZnS:Ag, (Ca, Mg)$SiO_3$:Eu, $CaWO_4$, (Ca, Mg)$SiO_3$:Ti, (Y, Sr)$TaO_4$:Nb, $Y_2SiO_5$:Ce, $Zn_2SiO_4$:Ti, and $(Zn_{1-y}, Mg_y)(Al_xGa_{1-x})_2O_4$:Li (where x=0 to 0.2 and y=0 to 0.3) and the fluorescent materials used with a blue filter such as ZnO:Zn and $ZrO_2$, if each of them is used individually in the display portion of the fluorescent display device driven at an anode voltage of 2 KV or lower, the foregoing object cannot be completely achieved.

Concretely, the fluorescent material of ZnS:Ag is relatively low in resistance but contains S. Hence, it degrades the cathode. The materials of $(Zn_{1-y}, Mg_y)(Al_xGa_{1-x})_2O_4$:Li (where x=0 to 0.2 and y=0 to 0.3) and ZnO:Zn or ZrO2 used with a blue filter are low in resistance but are not so excellent in dependency of the emission luminance on the voltage density and the current one, because they are likely to be saturated if driven at an anode voltage of 100 V or higher. The fluorescent materials such as $CaWO_4$, (Ca, Mg)$SiO_3$:Ti, (Ca, Mg)$SiO_3$:Eu, (Y, Sr)$TaO_4$:Nb, and $Y_2SiO_5$:Ce, $Zn_2SiO_4$:Ti are all high in mother resistance, so the electrons are condensed on the surface of the material. Hence, those materials cannot be used in manufacturing the fluorescent display device. Further, the fluorescent materials such as $CaWO_4$, (Ca, Mg)$SiO_3$:Ti, (Ca, Mg)$SiO_3$:Eu, (Y, Sr)$TaO_4$:Nb, $Y_2SiO_5$:Ce, and $Zn_2SiO_4$:Ti may be used with being mixed with a conductive material such as $In_2O_3$. In this case, a non-luminous material is mixed with the fluorescent material. It means that the non-luminous portion is present on the fluorescent surface, which is disadvantageous in effectively taking out the emission.

The inventors of the present application have repetitively tried the experiments and studies on the basis of the foregoing fact about each fluorescent material. As a result, the inventors have invented the following fluorescent material as a blue emission fluorescent material for achieving the foregoing object. That is, the invented fluorescent material is basically composed of a low resistive fluorescent material that is inferior in the voltage and current characteristic and a highly resistive fluorescent material that is superior in the voltage and current characteristic if driven at an anode voltage of 1 KV or higher, both of which are properly combined and mixed at a proper ratio.

As the low resistive fluorescent material, the material of $ZnGa_2O_4$:Li whose average grain diameter is about 2.5 μm is selected from $(Zn_{1-y}, Mg_y)(Al_xGa_{1-x})_2O_4$:Li (where x0 to 0.2 and y=0 to 0.3). As the highly resistive fluorescent material, the material of $Y_2SiO_5$:Ce whose average grain diameter is about 5 μm is used. These fluorescent materials are mixed at different mixing ratios for manufacturing various trial materials with different mixing ratios. For the comparison, various fluorescent materials with different mixing ratios are prepared. Those fluorescent materials are composed of the $Y_2SiO_5$:Ce fluorescent material and the $In_2O_3$ material mixed at variable mixing ratios. Further, for the comparison, the $ZnGa_2O_4$:Li fluorescent material and the $Y_2SiO_5$:Ce fluorescent material are solely prepared. A fluorescent display devices are manufactured in which these fluorescent materials is coated on an anode conductor thereof respectively. Each of the resulting fluorescent display devices is driven in the same state, where the emission luminances of the display devices are compared with one another in relative luminance.

FIG. 7 shows each emission luminance of the fluorescent material of $ZnGa_2O_4$:Li, the fluorescent material of $Y_2SiO_5$:Ce, and the fluorescent material of this embodiment that is composed of a mixture of the these two materials. The mixing ratio of the fluorescent material of this embodiment is $ZnGa2O_4$:Li/$Y_2SiO_5$:Ce=5/95.

FIG. 8 shows each emission luminance of the fluorescent display device having the fluorescent material of this embodiment and another fluorescent display device having the $Y_2SiO_5$:Ce fluorescent material mixed with $In_2O_3$ where they are driven at an anode voltage of 400 V. At any mixing ratio, the fluorescent display device of this embodiment is superior in emission luminance to the $Y_2SiO_5$:Ce fluorescent material mixed with $In_2O_3$. In the range of the mixing ratio of the fluorescent materials, that is, $ZnGa_2O_4$:Li/$Y_2SiO_5$:Ce=1/99 to 99/1, the effective result is provided. In particular, in the range of 2/98 to 95/5, the excellent result is provided. In the range of 20/80 to 50/50, the more excellent result is provided. Moreover, the fluorescent material of this embodiment provides such a tone as being used as the blue emission fluorescent material in the full-color fluorescent display device without any problem.

Table 1 indicates the data of the examples in which $CaWO_4$, (Ca, Mg)$SiO_3$:Eu, (Y, Sr)$TaO_4$:Nb, or $Zn_2SiO_4$:Ti are used in place of the $Y_2SiO_5$:Ce that is a highly resistive blue emission fluorescent material. The other conditions are the same as the foregoing example.

TABLE 1

| Highly Resistive Fluorescent Material | Luminance of Fluorescent Material with no mixed material | Relative Luminance of only $ZnGa_2O_4$:Li | Relative Luminance of Fluorescent Material with Optical Mixture | | Mixing Range of $ZnGa_2O_4$:Li |
|---|---|---|---|---|---|
| | | | $ZnGa_2O_4$:Li (This embodiment) | $In_2O_3$ (Cited Reference) | |
| (Ca,Mg)$SiO_3$:Eu | 100 | 150 | 200 | 110 | 5–90 |
| (Y,Sr)$TaO_4$:Nb | 100 | 120 | 150 | 105 | 2–90 |
| $Zn_2SiO_4$:Ti | 100 | 200 | 250 | 115 | 5–80 |

The table 2 indicates the data of the examples in which as the low resistive blue emission fluorescent material, the ZnO:Zn with the blue filter is used, and as the highly resistive blue emission fluorescent material, the material of (Ca, Mg)$SiO_3$:Eu, (Y, Sr)$TaO_4$:Tb, $Zn_2SiO_4$:Ti or $Y_2SiO_5$:Ce are used. The other conditions are the same as the foregoing example.

TABLE 2

| Highly Resistive Fluorescent Material | Luminance of Fluorescent Material with no mixed material | Relative Luminance of only ZnO:Zn + Blue Filter | Relative Luminance of Fluorescent Material with Optical Mixture | | ZnGa2O4:Li Mixing Range of ZnO:Zn |
|---|---|---|---|---|---|
| | | | ZnO:Zn + blue (This embodiment) | $In_2O_3$ (Cited Reference) | |
| (Ca,Mg)$SiO_3$:Eu | 100 | 200 | 250 | 110 | 5–90 |
| (Y,Sr)$TaO_4$:Nb | 100 | 250 | 280 | 130 | 2–90 |
| $Zn_2SiO_4$:Ti | 100 | 220 | 245 | 115 | 5–90 |
| $Y_2SiO_5$:Ce | 100 | 140 | 180 | 110 | 5–80 |

In the examples listed in Tables 1 and 2, the fluorescent material of this embodiment composed by mixing the low resistive fluorescent material and the highly resistive fluorescent material at a proper ratio is superior in luminance characteristic to each fluorescent material used individually or the composition having the highly resistive fluorescent material mixed with $In_2O_3$. Since the fluorescent material of this embodiment does not contain S, if it is applied to the fluorescent display device, it does not degrade the cathode. Hence, the fluorescent material of this embodiment provides such an excellent tone as being used as a blue emission fluorescent material of the full-color fluorescent display device without any problem.

In the fluorescent materials described in the items (1) to (3), each material is composed of a mixture of one of low resistive fluorescent material and one of highly resistive fluorescent materials. However, two or more low resistive fluorescent materials and two or more highly resistive fluorescent materials may be mixed for composing the final fluorescent material. This material may offer the same or higher effect.

(4) Fluorescent Display Device Having Filament Cathode

Next, the description will be oriented to a fluorescent display device having an anode provided with the aforementioned fluorescent material of this embodiment and a filament oxide cathode as a cathode served as an electron emission source.

Figure 9:
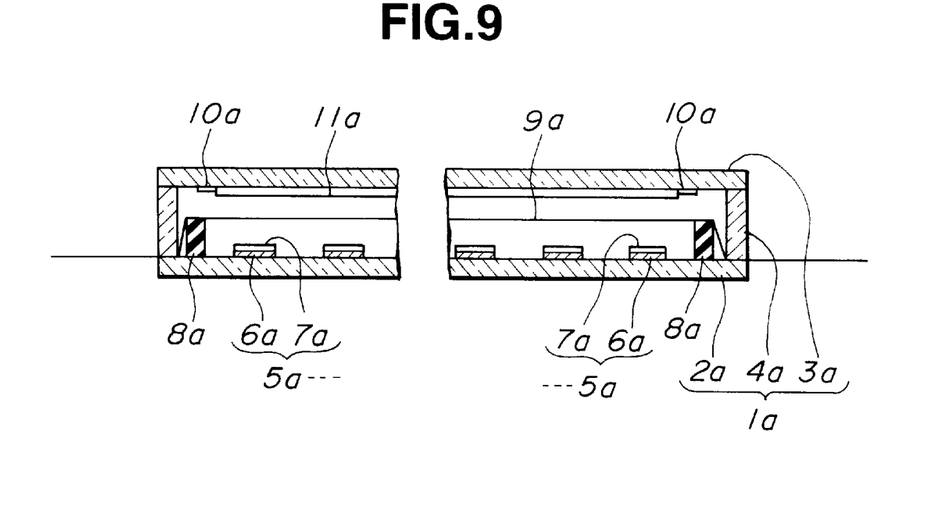
FIG. 9 is a sectional view showing a structure of a fluorescent display device having the fluorescent material of the present invention as an anode and a filament type oxide cathode as a cathode.

FIG. 9 is a sectional view showing fluorescent display device of graphic display type. This fluorescent display device includes an envelope 1a, a transparent front plate 2a, a rear plate 3a opposite to the front plate 2a, and a side plate 4a located between the outer peripheral portions of the front plate 2a and the rear plate 3a, which are sealed and attached with one another. The display device is in the shape of box. The envelope 1a is kept in a highly vacuum state inside of itself.

Inside of the front plate 2a, band-like anodes 5a are located in parallel to each other at predetermined intervals. Each anode 5a is composed of a transparent band-like anode conductor 6a located inside of the front plate 2a and a fluorescent layer 7a coated on the top of the anode conductor 6a.

The fluorescent layer 7a located on the anode 5a is composed of the foregoing fluorescent material, that is, the mixture of the low resistive fluorescent material and the highly resistive fluorescent material. The fluorescent material composing the fluorescent layer 7a of each adjacent anode 5a is composed of three kinds of emission fluorescent materials of this embodiment having emissions of red, green, and blue respectively. These fluorescent materials are arranged by turns to compose the fluorescent layer 7a.

Above the anode 5a located in the envelope 1a, linear control electrodes 9a are located in parallel to each other and kept at a predetermined interval with a spacer 8a laid between the adjacent electrodes 9a. Each control electrode 9a is lengthwise crossed at right angles with the anode 5a. Both ends of each control electrode 9a is hermetically penetrated through a sealing portion of the envelope 1a and then is pulled out of the envelope 1a. Inside of the rear plate 3a located in the envelope 1a, there is stretched a linear cathode 11a served as an electron source through a mounting frame 10a.

To drive the fluorescent display device, a scan signal is applied to the adjacent two control electrodes 9a and 9a so that those electrodes are scanned one by one in sequence. Synchronized with the scan of the control electrode 9a, a display signal is applied to the anode 5a. The area enclosed by the band-like anode 5a and the two control electrodes 9a and 9a crossed at right angles with the anode 5a compose a unit luminous area. The set of selected unit luminous areas composes a full-color image on the display.

The fluorescent display device of this embodiment provides an excellent tone of each fluorescent material used therefor and offers high display quality. Further, since the used fluorescent material does not contain S, the durability of the cathode is not degraded.

(5) Fluorescent Display Device Having Field Emission Cathode

Next, the description will be oriented to a fluorescent display device having an anode with the foregoing fluorescent material of this embodiment and a cathode which is a field emission cathode served as an electron-emission source.

Figure 10:
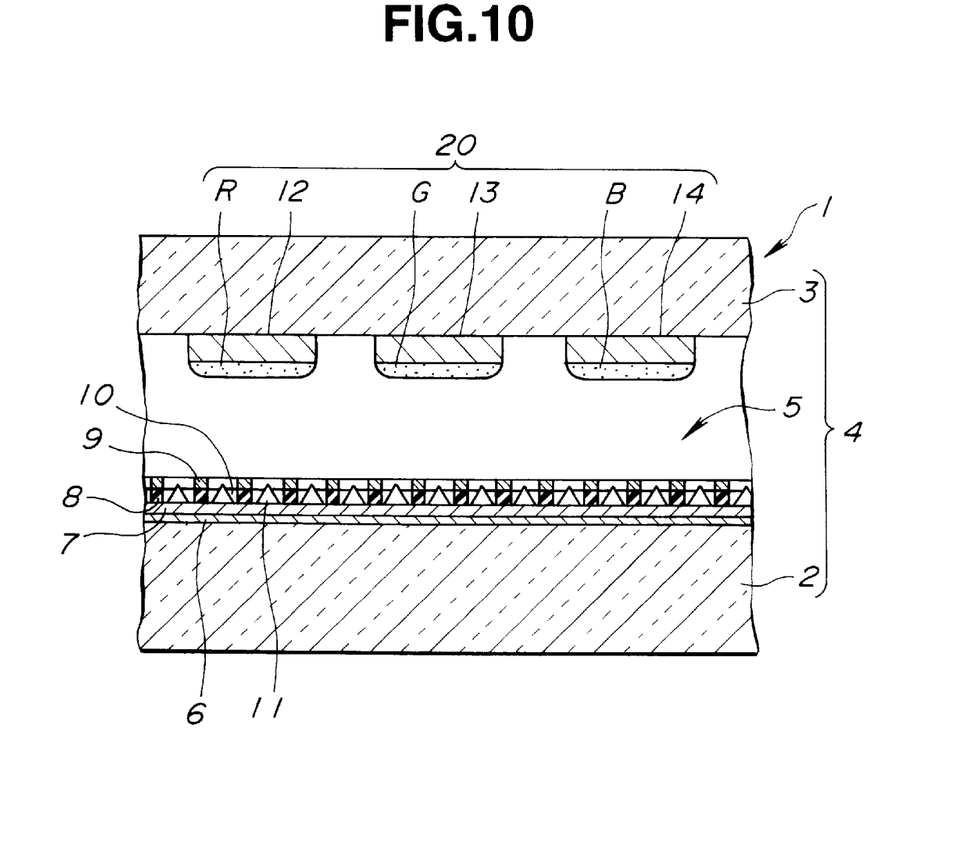
FIG. 10 is a sectional view showing a structure of a fluorescent display device having a fluorescent material of the present invention as an anode and a field-emission type cathode as a cathode.

FIG. 10 is a sectional view showing an example of a field emission element. Fluorescent display device 1 of the field emission type includes a first substrate 2 and a second substrate 3 opposite to each other at a predetermined interval spaced therebetween. Though not shown, the outer peripheral portions of the substrates 2 and 3 are sealed by a sealing materials served as a spacer, for composing the envelope 4 that is kept in a high vacuum state inside thereof.

Inside of the first substrate 2, an FEC (Field Emission Cathode) 5 is composed. It is served as an electron source. A resistance layer 7 is located on the cathode conductor 6 located inside of the first substrate 2. On the resistance layer 7, there is provided a gate electrode 9 through an insulating layer 8. A lot of voids are formed on the gate electrode 9 and the insulating layer 8 so that those voids reach the resistance layer 7. On the resistance layer 7 in each void 10, a cone-like emitter 11 is formed.

The cathode conductor 6 having lots of emitters 11 is composed of many band-like conductors located in parallel to each other. The gate electrode 9 is composed of many band-like electrodes crossed at right angles with the band-like cathode conductors 6 and located in parallel to each other. By scanning either of the cathode conductor 6 and the gate electrode 9 which compose the matrix and applying a selecting signal to the other, it is possible to select any portion of the planar FEC 5 and emit electrons from this portion.

Inside of the second substrate 3 opposite to the FEC 5, there is composed a luminous display portion 20. The luminous display portion 20 is composed of three display portions for red, green and blue. Inside of the second substrate 3, transparent anode conductors 12, 13 and 14 are repetitively coated at a predetermined interval kept therebetween. On each of the anode conductors 12, 13 and 14, three kinds of fluorescent materials R, G and B are coated. Each of the fluorescent materials has as a luminous color a red, a green or a blue.

Each of the fluorescent materials R, G and B provided on the anode conductors 12, 13 and 14 is composed of a mixture of the low resistive fluorescent material and the highly resistive fluorescent material.

Herein, the first and the second substrates 2 and 3 are made of glass plates. The cathode conductor 6, the gate electrode 9 and the emitter 11 are composed of Mo. The resistance layer 7 is composed of amorphous silicon with P or B doped therein (a-Si). The insulating layer 8 is composed of $SiO_2$. The anode conductors 12, 13 and 14 are composed of ITO. Since these anode conductors 12, 13 and 14 need to be transparent, they may be composed of transparent and conductive thin film or an aluminium or metallic thin film having a mesh or striped transparent structure in place of the ITO.

In order to drive the fluorescent display device, it is necessary to take the steps of scanning either of the cathode conductor and the gate electrode 9, applying a selecting signal to the other, and selecting any portion of the planar FEC 5 for emitting electrons from the selected portion. Synchronized with the drive of the cathode, a necessary display signal is applied to each anode conductor of the luminous display portion 20 so that a full-color image display is implemented.

The fluorescent display device of this embodiment provides an excellent tone of each fluorescent material to be used therefor and offers high display quality. Since it does not contain S, the durability of the cathode is not degraded.

Many widely different embodiments of the present invention may be constructed without departing from the spirit and scope of the present invention. It should be understood that the present invention is not limited to the specific embodiments described in the specification, except as defined in the appended claims.

What is claimed as new and is desired to be secured by the Letters Patent of the United States is:

1. A fluorescent display device comprising an anode; an electron source for emitting electrons; and a phosphor layer present on said anode; wherein said phosphor layer includes a fluorescent material comprising a mixture including a phosphor which is excitable at a voltage of 1 kV or higher for emitting light, and a phosphor which is excitable at a voltage of 1 kV or lower for emitting light, wherein each phosphor emits light of the same color, wherein the fluorescent material is luminous at an anode voltage of 2 kV or lower, and wherein said phosphor which is excitable at a voltage of 1 kV or higher is selected from a terbium activated yttrium aluminum gallium oxide phosphor, $Y_2SiO_5$:Tb, InBO3:Tb, or $Zn_2SiO_4$:Mn; said phosphor which is excitable at a voltage of 1 kV or lower is selected from $Zn(Ga,Al)_2O_4$:Mn; said phosphor layer emitting light upon impingement of electrons emitted from said electron source thereon, wherein said impingement of said electrons is effected by an anode voltage of 2 kV or less; and wherein said electron source is a filament oxide cathode.

2. A fluorescent display device comprising an anode; an electron source for emitting electrons; and a phosphor layer present on said anode; wherein said phosphor layer includes a fluorescent material comprising a mixture including a phosphor which is excitable at a voltage of 1 kV or higher for emitting light, and a phosphor which is excitable at a voltage of 1 kV or lower for emitting light, wherein each phosphor emits light of the same color, wherein the fluorescent material is luminous at an anode voltage of 2 kV or lower, and wherein said phosphor which is excitable at a voltage of 1 kV or higher is selected from a terbium activated yttrium aluminum gallium oxide phosphor, $Y_2SiO_5$:Tb, InBO3:Tb, or $Zn_2SiO_4$:Mn; said phosphor which is excitable at a voltage of 1 kV or lower is selected from $ZnAl_2O_4$:Mn or manganese activated zinc aluminum gallium oxide phosphor; said phosphor layer emitting light upon impingement of electrons emitted from said electron source thereon, wherein said impingement of said electrons is effected by an anode voltage of 2 kV or less; and wherein said electron source is a field emission cathode.

3. A fluorescent display device comprising an anode; an electron source for emitting electrons; and a phosphor layer present on said anode; wherein said phosphor layer includes a fluorescent material comprising a mixture including a phosphor which is excitable at a voltage of 1 kV or higher for emitting light, and a phosphor which is excitable at a voltage of 1 kV or lower for emitting light, wherein each phosphor emits light of the same color, wherein the fluorescent material is luminous at an anode voltage of 2 kV or lower, and wherein said phosphor which is excitable at a voltage of 1 kV or higher is selected from $Y_2SiO_5$:Ce, $CaWO_4$, a titanium activated calcium magnesium silicon oxide phosphor, a niobium activated yttrium strontium tantalum oxide phosphor, or $Zn_2SiO_4$:Ti; said phosphor which is excitable at a voltage of 1 kV or lower is selected from $ZnGa_2O_4$Li or ZnO:Zn; and emitting light upon impingement of electrons emitted from said electron source thereon; wherein said impingement of said electrons is effected by an anode voltage of 2 kV or less, and wherein said electron source is a filament oxide cathode.

4. A fluorescent display device comprising an anode; an electron source for emitting electrons; and a phosphor layer present on said anode; wherein said phosphor layer includes a fluorescent material comprising a mixture including a phosphor which is excitable at a voltage of 1 kV or higher for emitting light, and a phosphor which is excitable at a voltage of 1 kV or lower for emitting light, wherein each phosphor emits light of the same color, wherein the fluorescent material is luminous at an anode voltage of 2 kV or lower, and wherein said phosphor which is excitable at a voltage of 1 kV or higher is selected from $Y_2SiO_5$:Ce, $CaWO_4$, a titanium activated calcium magnesium silicon oxide phosphor, a niobium activated yttrium strontium tantalum oxide phosphor, or $Zn_2SiO_4$:Ti; said phosphor which is excitable at a voltage of 1 kV or lower is selected from $ZnGa_2O_4$Li or ZnO:Zn; and emitting light upon impingement of electrons emitted from said electron source thereon, wherein said impingement of said electrons is effected by an anode voltage of 2 kV or less, and wherein said electron source is a field emission cathode.

* * * * *

UNITED STATES PATENT AND TRADEMARK OFFICE
CERTIFICATE OF CORRECTION

PATENT NO.    : 6,168,729 B1
DATED         : January 2, 2001
INVENTOR(S)   : Hitoshi Toki et al It is certified that error appears in the above-identified patent and that said Letters Patent is hereby corrected as shown below:

Title page,
Insert the following:
-- (30) Foreign Application Priority Data
        Sept. 25, 1999 (JP)...07-246242 --.

Column 4,
Line 63, "$(Zn_{1-y}, Mg_y) (Al_xGa_{1-y})_2O_4:Mn$" should read -- $(Zn_{1-y}, Mg_y) (Al_xGa_{1-x})_2O_4:Mn$ --.

Column 6,
Line 4, "6is" should read -- 6 is --.

Column 7,
Line 18, "where x0 to" should read -- where x=0 to --.

Table 2,
Third listed material, "$Zn, _2SiO_4:Ti$" should read -- $Zn_2SiO_4:Ti$ --.

Signed and Sealed this

Thirteenth Day of November, 2001

Attest:

NICHOLAS P. GODICI
*Attesting Officer*     *Acting Director of the United States Patent and Trademark Office*